(12) United States Patent
Hayakawa et al.

(10) Patent No.: US 9,036,760 B2
(45) Date of Patent: May 19, 2015

(54) RECEIVING APPARATUS AND METHOD FOR DETECTING THE NUMBER OF BITS OF THE SAME VALUE IN A RECEIVED BIT STREAM

(71) Applicant: DENSO CORPORATION, Kariya, Aichi-pref. (JP)

(72) Inventors: Keita Hayakawa, Nagoya (JP); Hironobu Akita, Okazaki (JP); Hirofumi Yamamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/285,997

(22) Filed: May 23, 2014

(65) Prior Publication Data

US 2014/0355724 A1 Dec. 4, 2014

(30) Foreign Application Priority Data

May 29, 2013 (JP) ................................ 2013-112905
May 21, 2014 (JP) ................................ 2014-105207

(51) Int. Cl.
*H04L 25/38* (2006.01)
*H04L 7/033* (2006.01)

(52) U.S. Cl.
CPC ...................................... *H04L 7/033* (2013.01)

(58) Field of Classification Search
CPC ........... H04L 7/033; H04L 5/24; H04L 7/044; H04L 25/38; H04L 7/0008
USPC .......... 375/370, 369, 362, 226, 342; 370/252, 370/509; 713/600; 714/699, 709
See application file for complete search history.

(56) References Cited

U.S. PATENT DOCUMENTS

| | | | | |
|---|---|---|---|---|
| 5,764,703 | A | * 6/1998 | Charvin et al. | 375/317 |
| 6,483,882 | B1 | * 11/2002 | O'Dea | 375/343 |
| 2002/0196883 | A1 | 12/2002 | Best et al. | |
| 2004/0264617 | A1 | 12/2004 | Goko | |
| 2005/0111537 | A1 | * 5/2005 | Sunter et al. | 375/226 |
| 2005/0213696 | A1 | 9/2005 | Totsuka et al. | |
| 2007/0177700 | A1 | 8/2007 | Saeki | |
| 2012/0020399 | A1 | 1/2012 | Doi | |
| 2012/0051241 | A1 | * 3/2012 | Mori et al. | 370/252 |

FOREIGN PATENT DOCUMENTS

JP H05-227251 A 9/1993
WO 2014/010236 A1 1/2014

* cited by examiner

*Primary Examiner* — Phuong Phu
(74) *Attorney, Agent, or Firm* — Posz Law Group, PLC

(57) ABSTRACT

An edge interval measuring block measures a first same-edge interval. A bit number detector detects the number of bits in the first same-edge interval based on reference bit length information and detects a first number of bits in a same-value interval between consecutive bits of the same value by subtracting the number of bits in the known bit stream from the number of bits in the first same-edge interval. The edge interval measuring block then measures a second same-edge interval. The bit number detector detects the number of bits in the second same-edge interval based on the reference bit length information and detects a second number of bits in a bit stream of consecutive bits of the same value opposite to the value in the same-value interval by subtracting the first number of bits from the number of bits in the second same-edge interval.

22 Claims, 12 Drawing Sheets

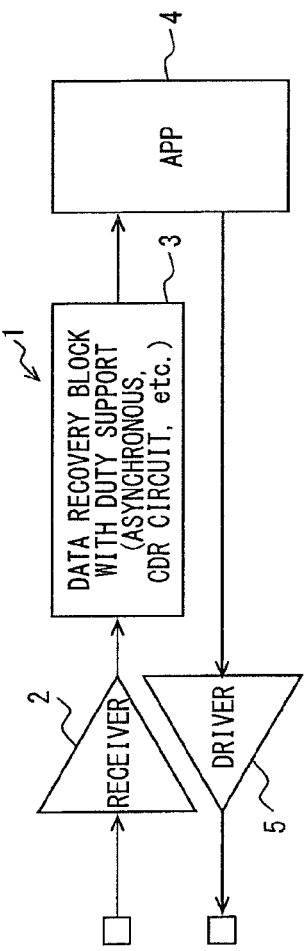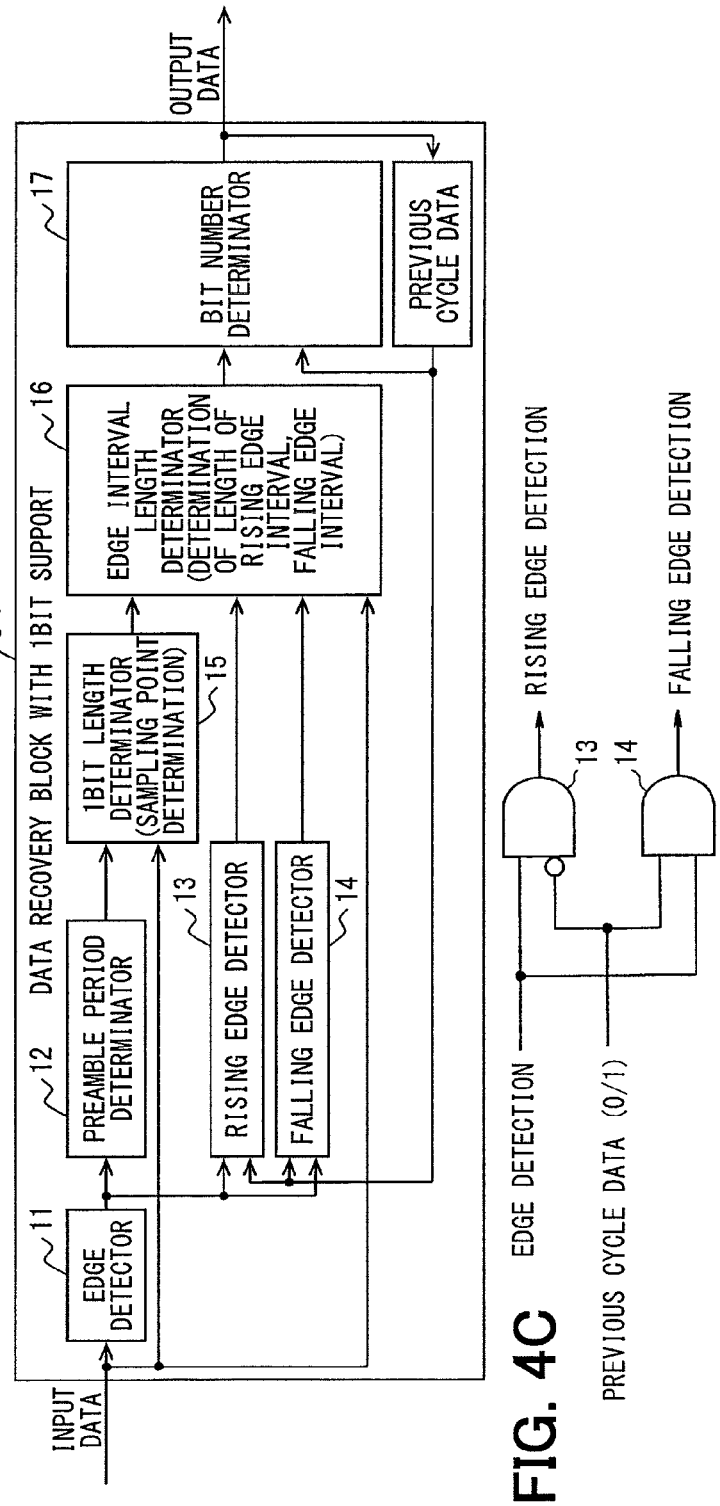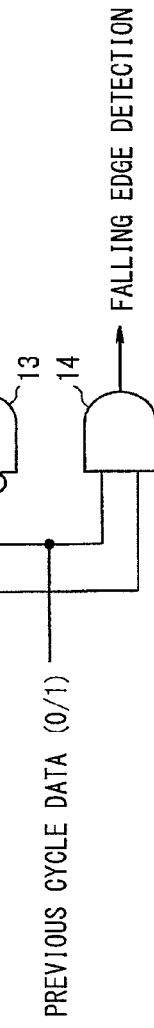
FIG. 4A
FIG. 4B
FIG. 4C

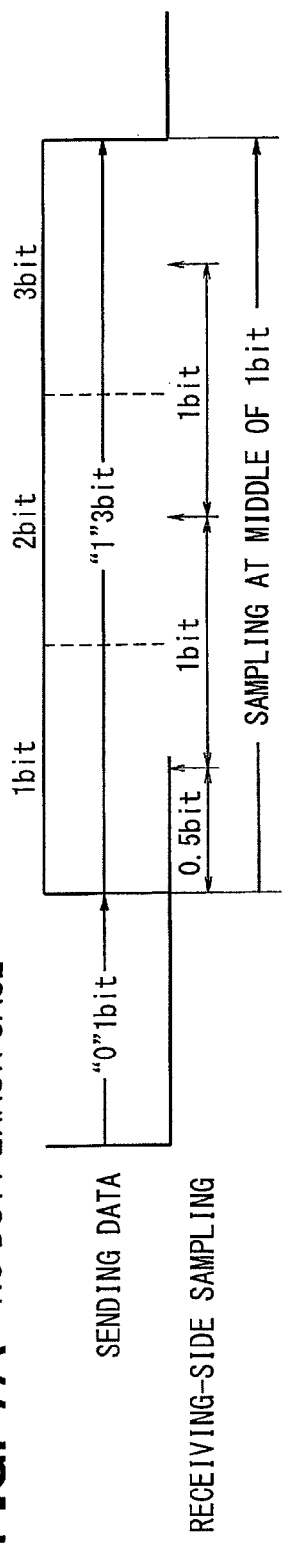
FIG. 7A NO DUTY ERROR CASE
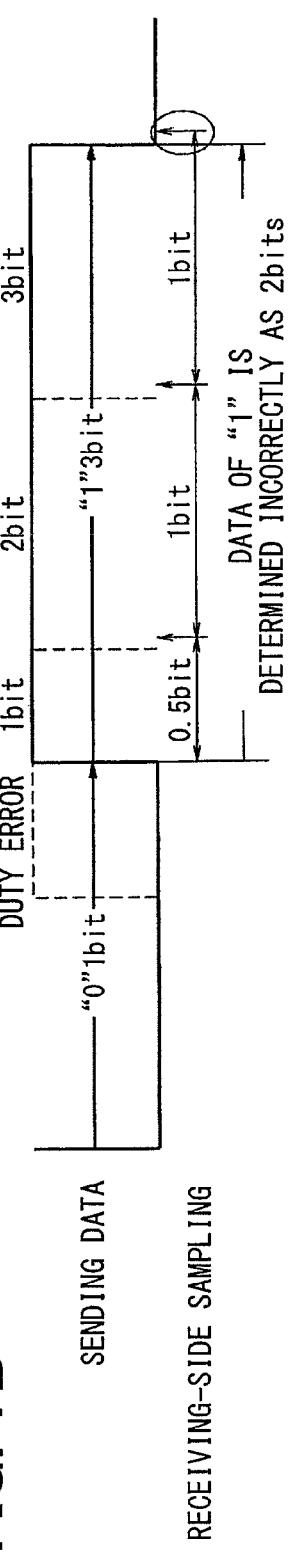
FIG. 7B DUTY ERROR CASE
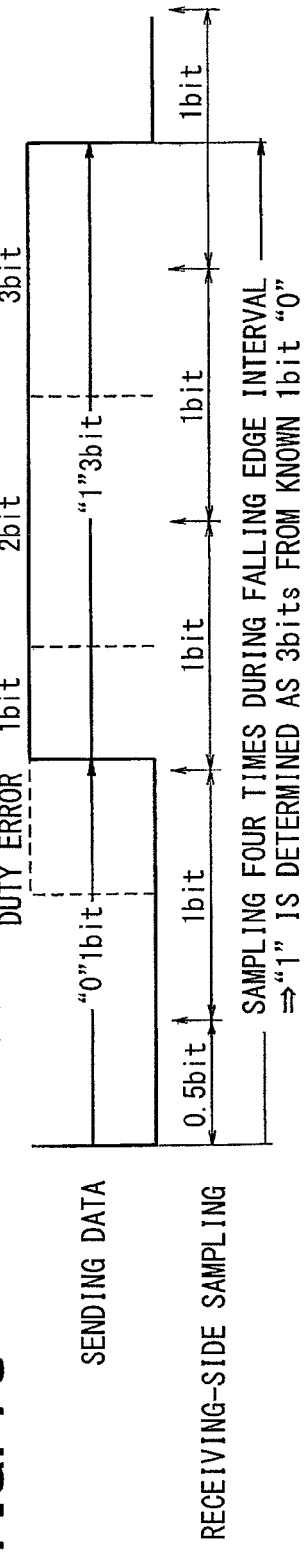
FIG. 7C PRESENT EMBODIMENT

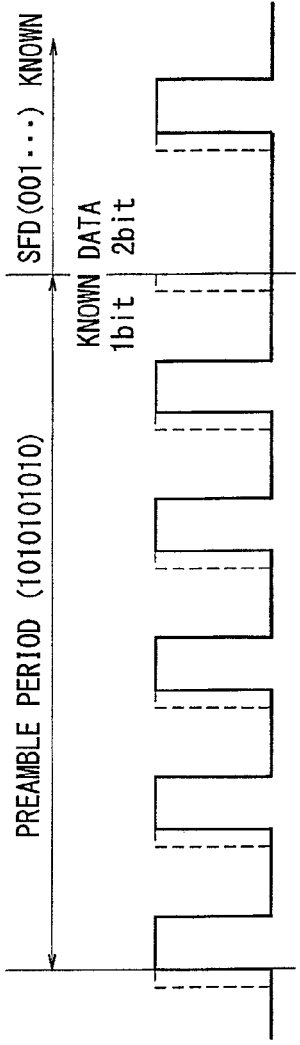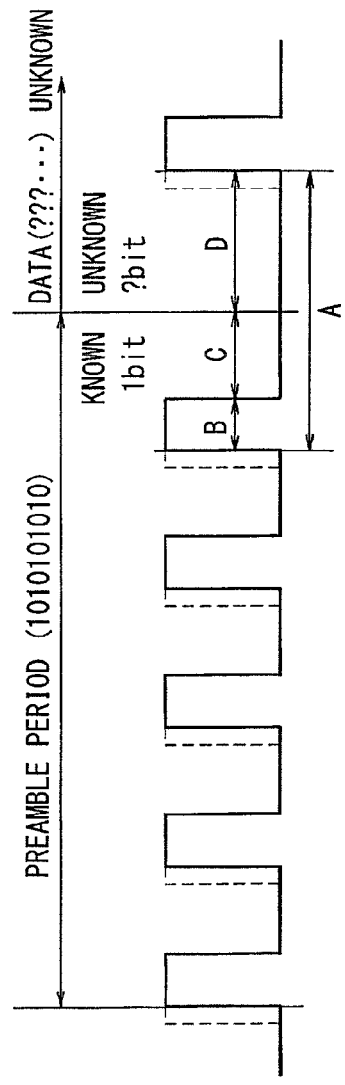
FIG. 11A
FIG. 11B
FIG. 11C

RECEIVING APPARATUS AND METHOD FOR DETECTING THE NUMBER OF BITS OF THE SAME VALUE IN A RECEIVED BIT STREAM

CROSS REFERENCE TO RELATED APPLICATION

This application is based on and claims priority to Japanese Patent Application No. 2013-112905 filed on May 29, 2013 and No. 2014-105207 filed on May 21, 2014, the contents of which are incorporated herein by reference.

FIELD

The present disclosure relates to a receiving apparatus and method for detecting the number of consecutive bits of the same value in a received bit stream.

BACKGROUND

In a receiver for communication, which does not use clock synchronization, including asynchronous communication and CDR (clock data recovery) communication, data recovery accuracy may be degraded if an error occurs in a duty of a pulse of received data due to characteristics of a circuit element used in a transmitting side. For example, assuming that a photocoupler is placed in a driver of the transmitting side or between the transmitting side and receiving side, its output stage is configured as an open drain output, and the output strength is not enough. As a result, an error occurs in timing of a rising edge and/or a falling edge of data recovered in a receiving side.

If the error occurs in timing of the edge as described above, the number of consecutive bits of the same value may be detected incorrectly. JP-A-2005-20471 corresponding to US 2004/0264617 discloses a technique for solving such a problem. An object of JP-A-2005-20471 is to remove the influence of the error by performing sampling at a phase timing corresponding to a center P of the width of a L pulse in received data.

In the technique disclosed in JP-A-2005-20471, the center P is given by the following formula: $P=\{T-(tH-tL)\}/2$. When a duty error is defined as "a", and "$tH=T+a$" and "$tL=T-a$" are substituted into the formula, the center P can be given as follows: $P=\{T-(T+a-(T-a))\}/2=T/2-a$. According to this calculation result, the center P is timing calculated by subtracting the duty error "a" from a half of a pulse period. Clearly, it is different from the center phase of the width of the L pulse where the duty error "a" occurs.

That is, since JP-A-2005-20471 fails to disclose a concrete configuration to perform sampling at the phase corresponding to the center P of the width of the L pulse, it may be almost impracticable.

SUMMARY

In view of the above, it is an object of the present disclosure to provide a receiving apparatus and a method capable of detecting the number of consecutive bits of the same value even when an error occurs in an edge in a received bit stream.

According to an aspect of the present disclosure, an edge interval measuring block measures a first same-edge interval from when a first start edge indicative of a start of a known bit stream of consecutive bits of the same value in a received bit stream is detected to when a next edge changing in the same direction as the first start edge is detected.

Then, a bit number detector detects the number of bits in the first same-edge interval based on reference bit length information and detects a first number of bits in a same-value interval between consecutive bits of the same value by subtracting the number of bits in the known bit stream from the number of bits in the first same-edge interval. That is, since a duty error in the received bit stream is mainly caused by characteristics of circuit elements of a transmitting side, an interval between edges changing in the same direction is not affected by the error. For this reason, the first number of bits in the same-value interval in the received bit stream following the known bit stream can be detected by subtracting the number of bits in the first same-edge interval from the number of bits in the known bit stream.

Further, the edge interval measuring block measures a second same-edge interval from when a second start edge (changing in a direction opposite to a direction the first start edge changes in) indicative of a start of the same-value interval is detected to when a next edge changing in the same direction as the second start edge is detected. Further, the bit number detector detects the number of bits in the second same-edge interval based on the reference bit length information and detects a second number of bits in a bit stream of consecutive bits of the same value opposite to the value in the same-value interval by subtracting the first number of bits from the number of bits in the second same-edge interval. Thus, the second number of bits following the first number of bits can be detected in the same manner.

BRIEF DESCRIPTION OF THE DRAWINGS

The above and other objects, features and advantages of the present disclosure will become more apparent from the following detailed description made with reference to the accompanying drawings. In the drawings:

FIG. 4A is a diagram illustrating a communication apparatus, FIG. 4B is a functional block diagram illustrating a data recovery block, and FIG. 4C is a diagram illustrating a rising edge detector and a falling edge detector;

FIGS. 7A-7C are diagrams explaining cases where a received data is detected in asynchronous communication;

FIG. 11A is a diagram explaining an example where a head of data followed by a preamble is detected when there is SFD, FIG. 11B is a diagram explaining an example where a head of data followed by the preamble is detected when there is no SFD, and FIG. 11C is a diagram explaining an example where a head of unknown data is "1" in the case of FIG. 11B, and FIGS. 12A and 12B are diagrams according to a third embodiment of the present disclosure and explaining how to apply the present disclosure to data frame used for CAN FD.

DETAILED DESCRIPTION (First Embodiment)

As shown in FIG. 4A, a communication apparatus (a receiving apparatus) 1 includes a receiver 2, a data recovery block 3, an application block (APP) 4, and a driver 5. The receiver 2 receives serial data transmitted through an unshown signal line and outputs the received bit stream to the data recovery block 3. The data recovery block 3 recovers binary data from the inputted received bit stream and outputs the data to the application block 4. The application block 4 includes a microcomputer, etc., performs software processing on the inputted received data according to contents of an application, and outputs the data to a communication line through the driver 5 as necessary.

Figure 5A:
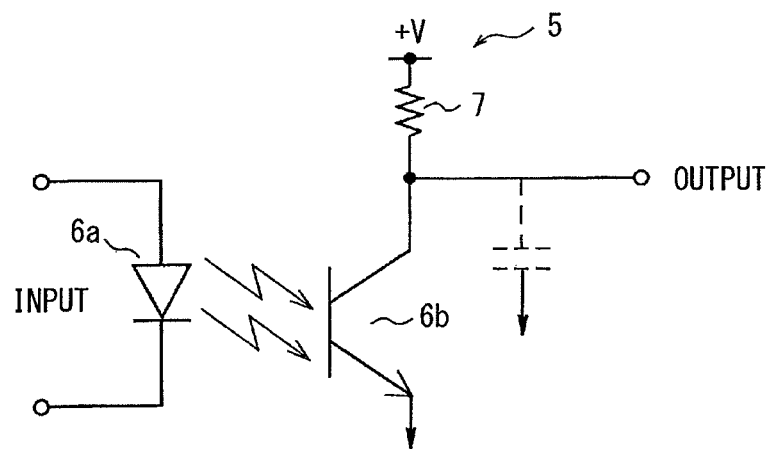
FIG. 5A is a diagram illustrating a driver shown in FIG. 4A.
Figure 5B:
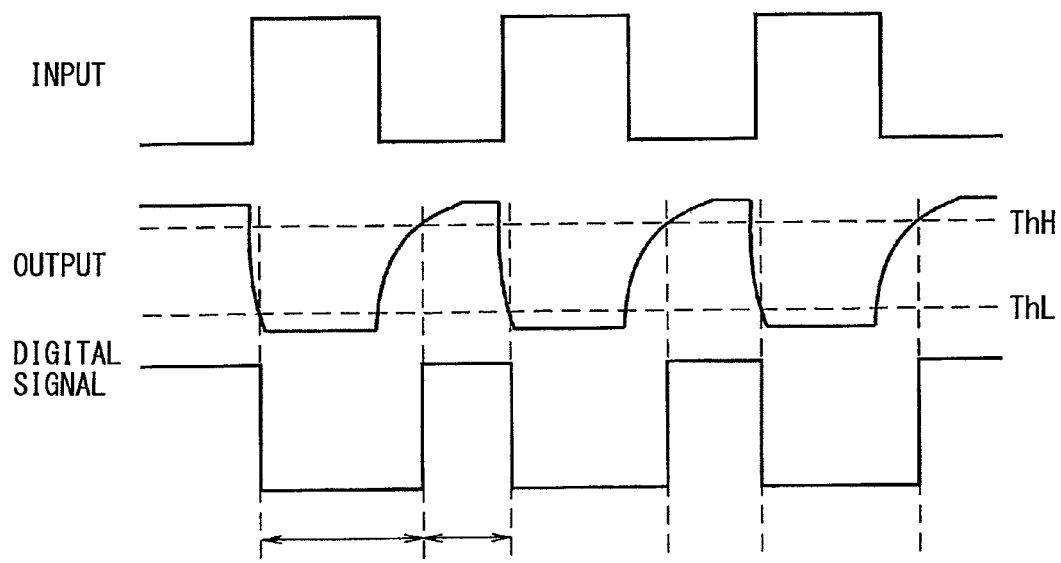
FIG. 5B is a diagram illustrating waveforms of input and output signals of a receiver.

As shown in FIG. 5A, the driver 5 includes a photocoupler which has a LED 6a as a light emitter and a phototransistor 6b as a light receiver. A collector of the phototransistor 6b is pulled up to a power supply +V through a resistor 7, and an emitter of the phototransistor 6b is connected to a ground. That is, the photocoupler has an open-collector output, and although output data represents the opposite logic-level to its input, a waveform of the output data is blunted due to a stray capacitance of the collector (see, FIG. 5B). In this case, the blunting is larger, in particular, on the rinsing edge side.

An output signal of the photocoupler is received by a Schmitt-trigger buffer, a hysteresis comparator, or the like at a receiving side (the receiver 2). Due to the blunting caused by the photocoupler, a duty of a signal pulse outputted as a received bit stream changes from a duty of an inputted signal pulse. In the example shown in FIG. 5B, a pulse with a duty of 50% changes in such a manner that a high data period is short and a low data period is long. If an error occurs in timing of the edge in this way, the number of consecutive bits of the same value may be detected incorrectly.

In the above example, the photocoupler is included in the driver 5. However, it is not always necessary that the photocoupler is included in the driver 5. As long as the photocoupler is anywhere between the transmitting side and the receiving side, the communication between the transmitting side and the receiving side may be affected in the same way.

Figure 1A:
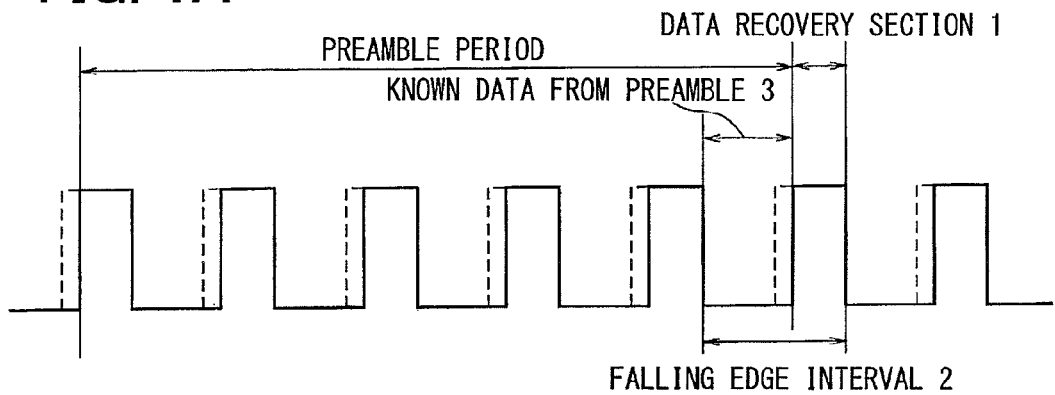
FIGS. 1A-1C are diagrams explaining a principle of detecting the number of consecutive bits of the same value in a received data.
Figure 1B:
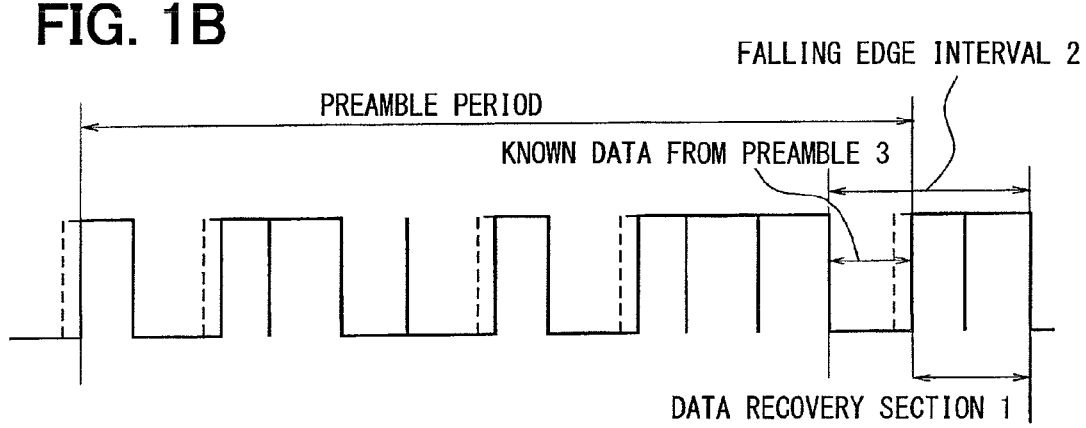

Next, a principle of detecting the number of bits according to the present embodiment is explained. As shown in FIG. 2, even when the error occurs in the timing of the edge of the signal pulse, neither an interval between the rising edges nor an interval between the falling edges is affected by the error. That is, as described above, an error in the duty of the received bit stream is mainly caused by characteristics of circuit elements of the transmitting side. Therefore, the interval between the edges changing in the same direction is not affected by the error. For this reason, the number of bits is detected in a manner as shown in FIGS. 1A to 1C.

If the last data (the last bit) of a preamble is "0", an interval (a first same edge interval) between a falling edge indicating the start of the last data of the preamble (a first start edge) and a next falling edge is detected. It is noted that the number of bits of the last data (3) is "1". Therefore, if the number of bits of the interval is known, the number of bits of the remaining portion (1) can be accurately detected by subtracting "1" from the number of bits of the falling edge interval (2). That is, period (2)−period (3)=period (1). Therefore, in the case of FIG. 1A, since 2−1=1, it can be determined that the head of the data following the preamble is one bit. This method can be applied to other cases in addition to the case of the data of one bit. In the case of FIG. 1B, since 3−1=2, it can be determined that the head of the data is two bits.

Figure 1C:
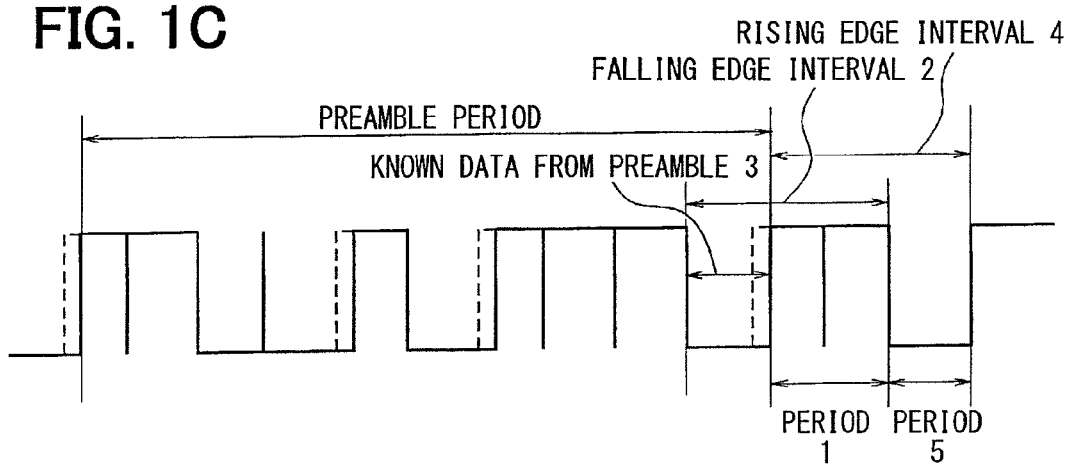
Figure 2:
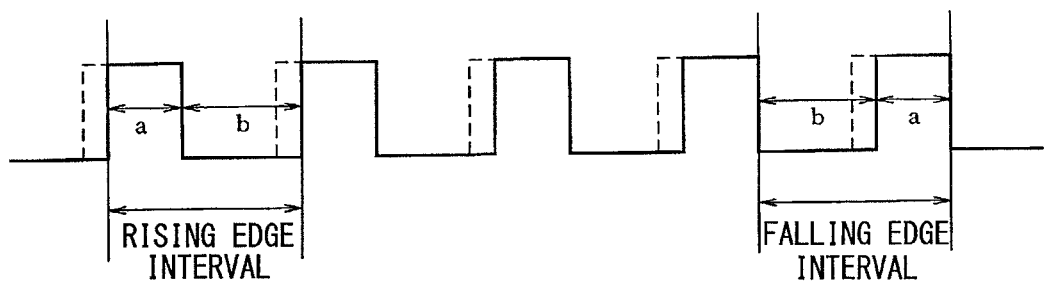
FIG. 2 is a diagram explaining that an interval between the same edges is not affected by a duty error.

Next, as shown in FIG. 1C, an interval (a second same-edge interval) between rising edges (second start edges) containing the period (1) is detected, and the number of bits of the interval is determined. This is defined as the "period (4)". Further, when a section of unknown consecutive bits included in the period (4) is defined as the "period (5)", period (4)−period (1)=period (5). Therefore, the number of bits (a second bit number) of the period (5) can be determined. In this way, the number of unknown consecutive bits can be calculated by determining the number of bits of the rising edge interval or the falling edge interval containing the number of known consecutive bits and consecutive bits immediately after the known consecutive bits. The whole subsequent bit stream can be obtained by repeating this process.

Like the period (1) and the period (5), a section whose number of bits has been known in the received bit stream is treated thereafter as the "known bit stream".

As shown in FIG. 4B, the data recovery block 3 has an edge detector 11 for detecting an edge of the inputted received bit stream. The edge includes both a rising edge corresponding to a change from a low level to a high level and a falling edge corresponding to a change from a high level to a low level.

Figure 3:
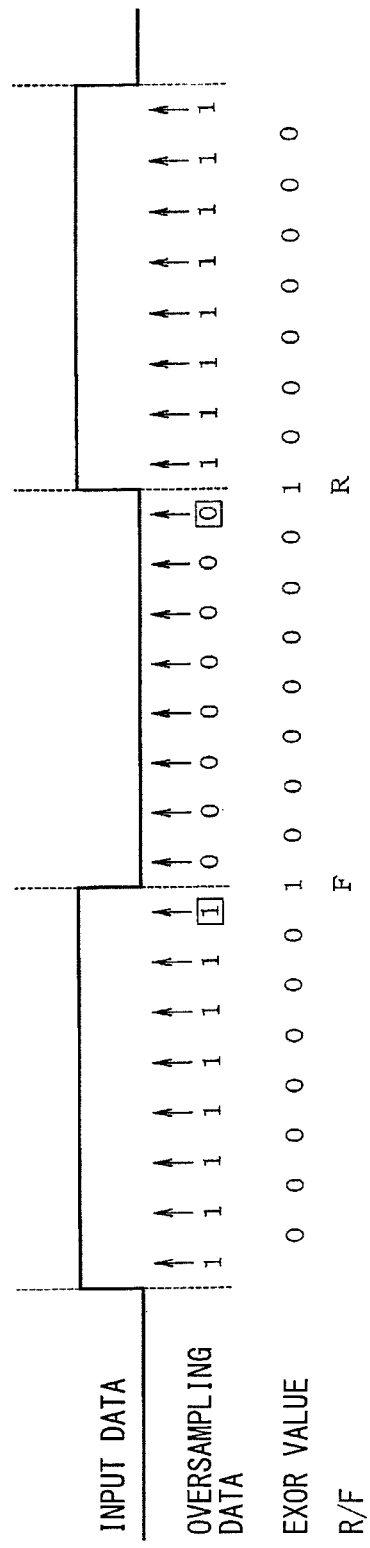
FIG. 3 is a diagram explaining oversampling performed by rising and falling edge detectors to detect edges.

For example, as shown in FIG. 3, the edge detector 11 detects the edge by oversampling input data (i.e., received bit stream) and by performing exclusive-OR (EXOR) between the presently sampled data and the previously sampled data which was sampled before the presently sampled data by one sampling cycle. Thus, "1" (edge detection signal) is outputted upon detection of the edge. The edge detection signal is inputted to a preamble period determinator 12 (an edge interval measuring block), a rising edge detector 13, and a falling edge detector 14.

The preamble period determinator 12 detects the length of the period of the preamble and outputs a detection result to a 1 bit-length determinator 15. The preamble has a specific data pattern and is arranged in the head of the received bit stream. The 1 bit-length determinator 15 (an edge interval measuring block) calculates a 1 bit-length-equivalent period (reference bit length information) by dividing the length of the period by the number of bits of the preamble and outputs a calculation result to an edge interval length determinator 16 (an edge interval measuring block).

As shown in FIG. 4C, each of the rising edge detector 13 and the falling edge detector 14 is configured as an AND gate. The rising edge detector 13 outputs a rising edge detection signal to the edge interval length determinator 16, if a value of one-cycle previous data supplied to its negative logic input is "0" when the edge detection signal is inputted. The falling edge detector 14 outputs a falling edge detection signal to the edge interval length determinator 16, if the value of the one-cycle previous data is "1" when the edge detection signal is inputted (see, FIG. 3).

The edge interval length determinator 16 includes a first block and a second block. The input data is supplied directly to the edge interval length determinator 16. Upon receipt of the rising edge detection signal or the falling edge detection signal, the edge interval length determinator 16 measures the time of the same edge interval by sampling the data each time half or almost half of the 1 bit-length-equivalent period elapses (a first block). Then, for example, when the sampling is started by the falling edge, the number of times the input data is sampled until the next falling edge is detected is counted as the "edge interval length", and it is determined how many bits the edge interval length corresponds to (a second block, an edge interval measuring block). The determined number of bits is outputted to a bit number determinator 17 (a bit number detector). The bit number determinator 17 determines the number of unknown consecutive bits from the number of bits corresponding to the inputted rising or falling edge interval (the number of samplings) and the previous known data (last data with a value different from a value of data in the same-value interval) and outputs the determined number.

Figure 6:
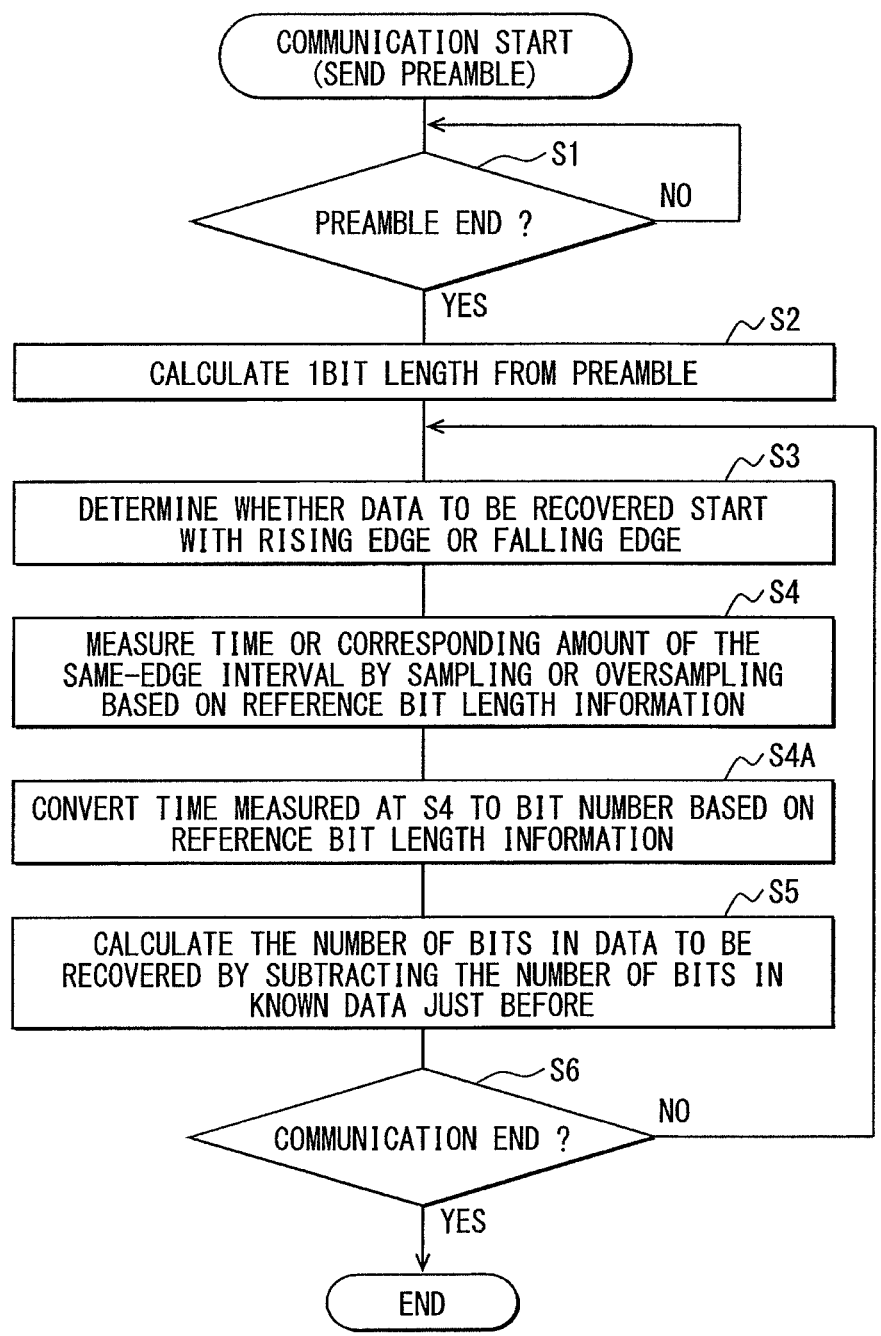
FIG. 6 is a flowchart corresponding to a function of the data recovery block.

Next, effects of the present embodiment are described. As shown in FIG. 6, the preamble period determinator 12 determines whether the preamble ends based on the edge detection signal inputted from the edge detector 11 (S1). For example, in the example shown in FIG. 1A, the preamble has ten bits alternating between "1" (high) and "0" (low). Therefore, in this case, when the edge detection signal is inputted eleven times, the preamble ends (YES).

The preamble period determinator 12 determines the length of the period from the first rising edge indicating the start of the preamble to the last rising edge indicating the end of the preamble and outputs the determined length to the 1 bit-length determinator 15. In patterns shown in FIGS. 1A to 1C, the 1 bit-length determinator 15 calculates the 1 bit-length-equivalent period by dividing the preamble period by the number of bits "10" (S2).

The edge interval length determinator 16 determines a target edge whose edge interval is to be determined firstly (S3). In the patterns shown in FIGS. 1A to 1C, since the target edge is the falling edge, data sampling is performed for the falling edge interval, and the time (or corresponding amount) of the falling edge interval is measured (S4). Then, the edge interval length determinator 16 determines the number of bits corresponding to the number of times the sampling is performed in the falling edge interval and outputs the determined number of bits to the bit number determinator 17 (S4A). The bit number determinator 17 determines the first number of bits in an unknown data section in the same edge interval from the number of bits corresponding to the falling edge interval and the number of bits of the last data of the preamble and outputs the first number of bits (S5). The steps S3-S5 are repeated until a communication ends (S6: NO).

An example where received data is detected in asynchronous communication is described below with reference to FIG. 7A. In asynchronous communication, the first data is sampled at the timing corresponding to 0.5 bits from an edge. Then, until a next edge comes, the sampling is performed each time a time corresponding to 1 bit elapses since the first sampling point. In this way, the sampling is performed at the middle of 1 bit.

Therefore, as shown in FIG. 7B, if an error occurs in a duty, i.e., an error occurs in the timing of occurrence of the edge, the sampling point is shifted accordingly. As a result, a determination may be made incorrectly if data of the same value continues (a period where three bits of a data value "1" continue may be determined incorrectly as two bits).

In contrast, according to the first embodiment, as shown in FIG. 7C, even when an error occurs in the duty in the same manner as shown in FIG. 7B, the sampling is performed four times during the falling edge interval. Therefore, the period where the data value "1" continues can be determined correctly as three bits by subtracting the bit number "1" of the previous known data from the sampling number "4".

The oversampling shown in FIG. 3 can be used to obtain a period corresponding to 0.5 bits for determining the first data sampling timing in asynchronous communication. For example, for ten-times oversampling, 1 bit corresponds to 10 samples on the premise that there is no frequency error and no jitter. Therefore, 0.5 bits corresponds to 5 samples. In binary calculations, the sample number "5" corresponding to 0.5 bits can be obtained by shifting the sample number "10" corresponding to 1 bit right by 1 bit as follows:

1010 B->0101 B

Then, the edge interval length determinator 16 and the bit-number determinator 17 detect the same-edge interval in the whole subsequent received bit stream in the same manner as in the boundary portion between the preamble and the bit stream following the preamble and calculates the number of bits in the same-value interval in the same-edge interval.

Figures 8A, 8B:
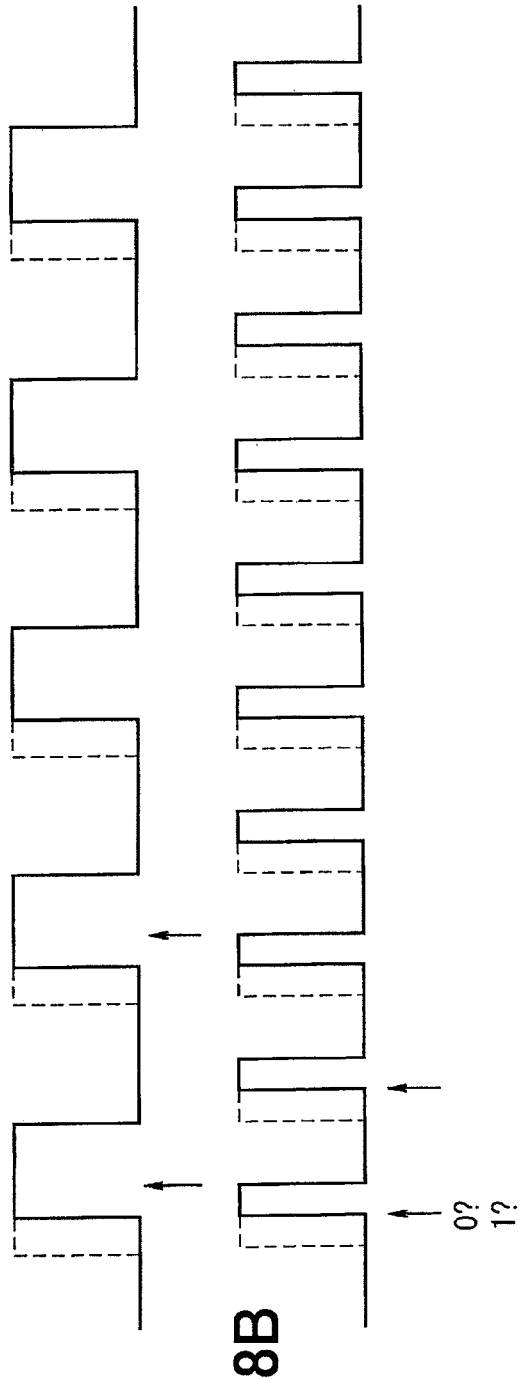
FIGS. 8A and 8B are diagrams explaining an influence of a duty error with respect to a change in a communication speed.

It is assumed that the sampling is performed at the middle of the 1-bit period on the premise that no duty error occurs. In this case, if a duty error occurs, the influence of the error increases with an increase in a communication speed as shown in FIGS. 8A and 8B. In contrast, according to the first embodiment, even when the communication speed increases, it is possible to correctly recover the received data by eliminating the influence of the error. The process shown in FIG. 6 can be implemented by software of a microcomputer.

As described above, according to the first embodiment, the edge interval length determinator 16 measures a first same-edge interval from when the falling edge indicating the start of the end part of the preamble placed at the start of the received bit stream is detected to when the next falling edge in the received bit stream is detected.

Then, the bit-number determinator 17 detects the number of bits in the first same-edge interval based the reference bit length information and detects the first number of bits in the same-value interval where the same data value continues by subtracting the number of bits in the end part from the detected number of bits. Since the duty error in the received bit stream is mainly caused by the characteristics of the circuit elements of the transmitting side, the interval between the edges changing in the same direction, i.e., the rising edge interval, the falling edge interval is not affected by the duty error. For this reason, the first number of bits in the same-value interval in the received bit stream following the preamble can be detected by subtracting the number of bits in the first same-edge interval from the known number of bits in the end part.

Further, the edge interval length determinator 16 and the bit-number determinator 17 detect the same-edge interval in the whole subsequent received bit stream in the same manner as in the boundary portion between the preamble and the bit stream following the preamble and calculates the number of bits in the same-value interval in the same-edge interval. Thus, the number of bits in the same-value interval in the whole received bit stream can be detected.

That is, since a bit stream of the same-value interval has become known, it is possible to determine the number of bits in a second same-edge interval containing the known consecutive bits of the same value and an unknown consecutive bits of the same value following the known consecutive bits and to calculate the number of the unknown consecutive bits of the same value (a second number of bits) by subtracting the number of the known consecutive bits from the number of bits in the second same-edge interval. The whole data can be obtained correctly by repeating the same process subsequently.

In this case, when the preamble period determinator 12 measures the length of the preamble period, the edge interval length determinator 16 measures the same-edge interval based on the length of the preamble period. Specifically, the 1 bit determinator 15 calculates the 1 bit-equivalent period based on the preamble period. The edge interval length determinator 16 determines the sampling timing based on the length of the 1 bit-equivalent period, samples data in the same-edge interval at the sampling timing, and measures the same-edge interval based on the sampling number. Therefore, the number of bits in the same-value interval can be detected by subtracting the number of bits in the known data from the sampling number.

It is noted that the edge interval length determinator 16 can measure the same-edge interval by oversampling. In such an approach, when the received bit stream is recovered in asynchronous communication, an interval corresponding to 0.5 bits for determining the sampling timing can be easily obtained.

(Second Embodiment)

Figure 9A:
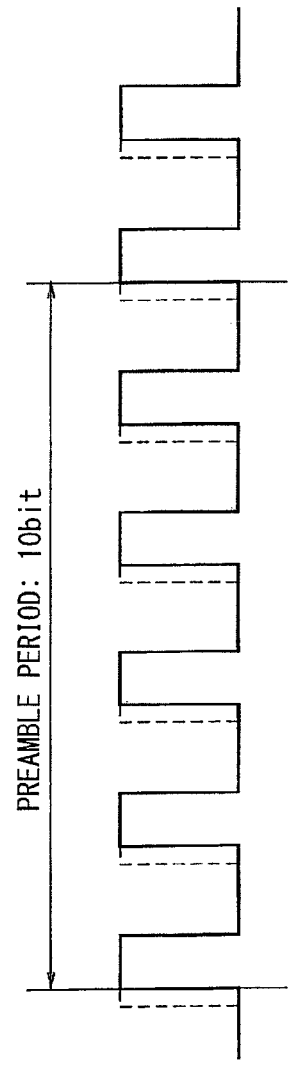
FIG. 9A is a diagram explaining whether a 1 bit-equivalent period can be obtained when a preamble has an even number of bits.
Figure 9B:
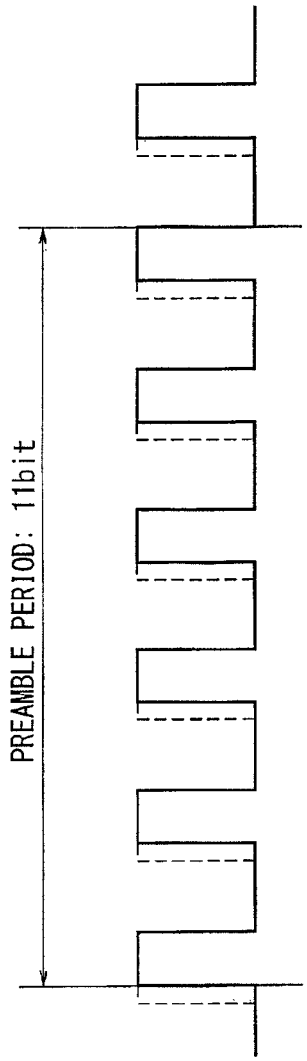
FIG. 9B is a diagram explaining whether the 1 bit-equivalent period can be obtained when the preamble has an odd number of bits.

According to a second embodiment, the 1-bit number can be detected even when the preamble has an odd number of bits. As shown in FIG. 9A (the same as in the first embodiment), when the preamble has ten bit, the 1-bit period can be obtained by dividing the preamble period between the rising edges by "10". In contrast, as shown in FIG. 9B, when the preamble has eleven bits, the preamble period ends at the falling edge. Therefore, when the 1 bit-equivalent period is calculated by dividing the preamble period by "11", the 1 bit-equivalent period can be affected by the duty error.

Figure 9C:
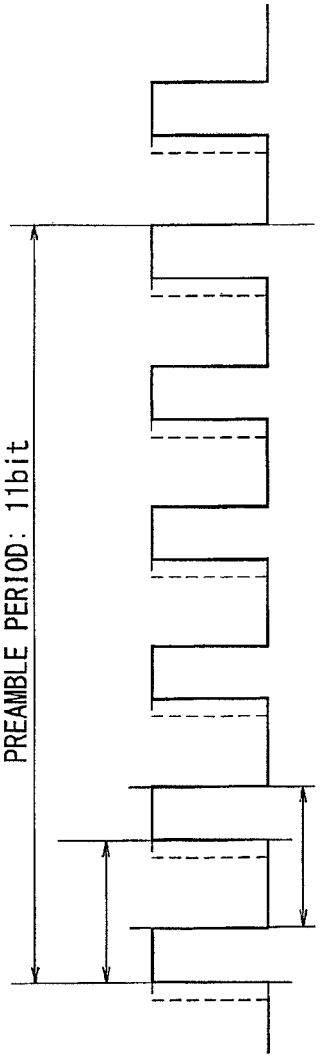
FIG. 9C is a diagram explaining a method for obtaining the 1 bit-equivalent period in the case of FIG. 9B according to a second embodiment of the present disclosure.
Figure 10:
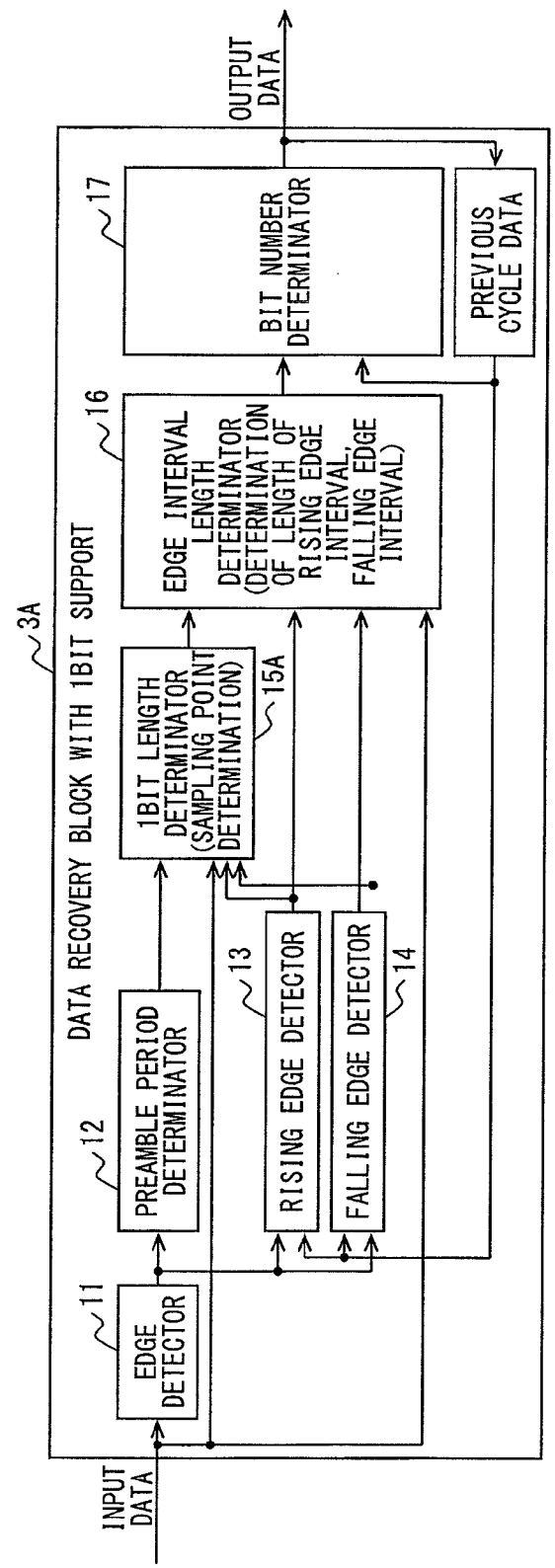
FIG. 10 is a functional block diagram illustrating a data recovery block according to the second embodiment.

For this reason, the second embodiment is configured so that the 1 bit-equivalent period can be obtained even in the case of FIG. 9B. That is, as shown in FIG. 9C, the length of the same-edge interval in the preamble is measured, and the 1 bit-equivalent period is obtained based on the number of bits in the same-edge interval. If the preamble is a repetition of "1010 . . . ", each of the rising edge interval and the falling edge interval has two bits. Therefore, a half of the same-edge interval is equal to the 1 bit-equivalent period. Likewise, 10 bits out of 11 bits can be used. If the preamble has a pattern different from the above pattern, the 1 bit-equivalent period can be obtained by prestoring the number of bits in the same-edge interval in a predetermined pattern. In such an approach, the reference bit period can be accurately calculated regardless of the bit pattern of the preamble. For this reason, as shown in FIG. 10, in a data recovery section 3A, the edge detection signals are inputted to the rising edge detector 13 and the falling edge detector 14 from a 1 bit-length determinator 15A.

Further, when the 1 bit-equivalent period is obtained in the above manner, there is no need to clearly detect the end of the preamble period. Therefore, the second embodiment can be used even in cases described below.

As shown in FIG. 11A to FIG. 11C, when the last data of the preamble is "0", and the first data in a bit stream following the preamble is also "0", there is no edge at the boundary therebetween. In this case, the end of the preamble period is not determined clearly, but what is needed is to identify the bit stream following the preamble. In a standard format, a SFD (start frame delimiter) is generally placed at the start of data following a preamble. The SFD has a known data pattern. Further, in general, when the last data of the preamble is "0", the first data of the SFD is set to "1" so that an edge can be produced at the boundary therebetween.

However, for example, as shown in FIG. 11A, even if the SFD has three bits with a data pattern "001", a determination that the last data "0" of the preamble and the first two bits "00" of the SFD following the preamble has been received can be made when the same rising edge as the start edge of the preamble occurs for the first time after the last falling edge in the preamble occurs. Therefore, a data recovery can be started after a next falling edge (after the SFD data "1").

Further, as shown in FIG. 11B, even if the SFD following the preamble is not placed so that the preamble can be directly followed by unknown data, the start of the data can be determined as follows. The end part of the preamble is set to have two bits "10" so that determination can start with a rising edge, and then a rising edge interval A is measured. If the number of bits in the rising edge interval A is four, it can be determined that the start of the data following the end part has two bits "00" because it is known that the end part has two bits "10".

Further, as shown in FIG. 11C, when the SFD is not placed, and the start of the unknown data is "1", an edge is produced therebetween. In this case, the rising edge interval A is calculated in the same way as described above as follows: A=B+C. Since B, C are known bits "10" in the end part, it can be determined that the start of the unknown data following the end part is "1". Then, the number of bits of "1" at the start of the data can be obtained by calculating the falling edge interval containing the bit "0" in the end part. Alternatively, the end part can be set to "100", "1000", etc. If the preamble has a different data pattern, the falling edge interval can be calculated by setting the end part to "01", "011", "0001", etc. That is, the end part can have any bit pattern of at least two bits, as long as a value of a start bit is different from a value of a bit following the start bit.

As described above, according to the second embodiment, the 1 bit-length determinator 15A measures the same-edge interval between edges changing in the same direction in the preamble period and calculates the 1 bit-equivalent period based on the number of bits in the same-edge interval. Further, the end part is set to have a bit pattern "10", and the interval between the rising edges as the start edge is measured. In such an approach, even when no edge is produced at the boundary between the preamble and a received bit stream following the preamble, data in the received bit stream can be identified by calculating the 1 bit-equivalent period.

(Third Embodiment)

Figure 12A:
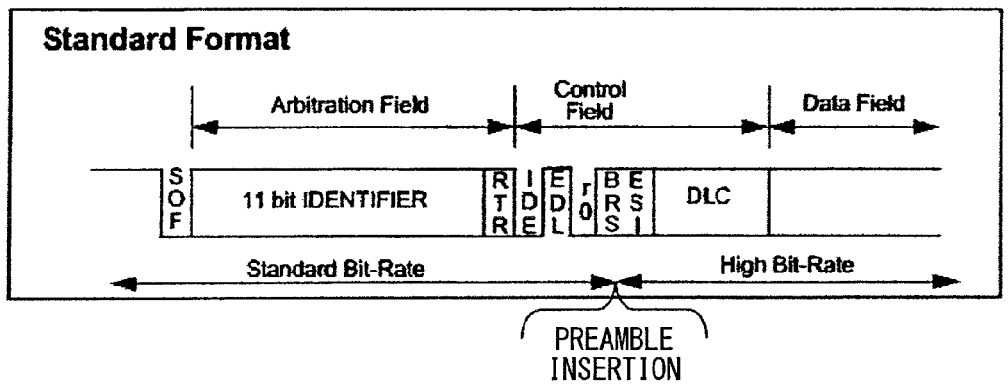
Figure 12B:
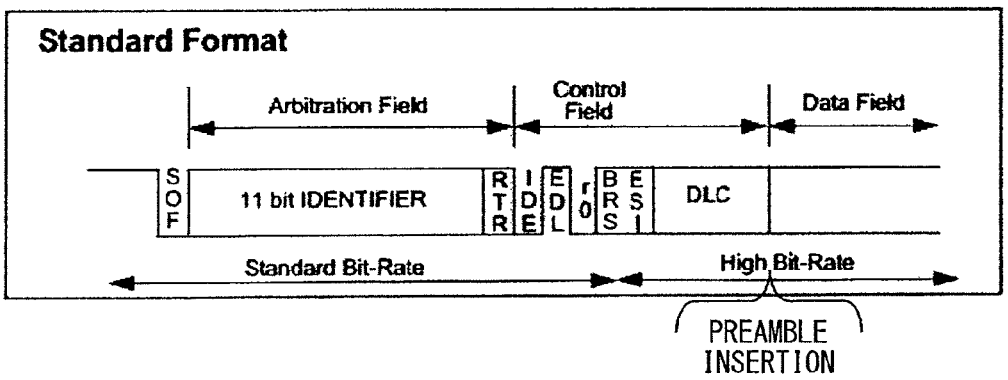

As shown in FIGS. 12A and 12B, the present disclosure can be applied to a data frame used for CAN FD (controller area network with flexible data rate), which is a kind of in-vehicle LAN. According to the specifications of the CAN FD, a communication speed can be changed in such a manner that communication starts at a low speed (at a standard bit rate) and then is performed at a high speed (at a high bit rate). The high-speed communication may be affected by the duty error, even if the low-speed communication is not affected.

Therefore, for example, the present disclosure can be used by inserting a preamble in a control field as shown in FIG. 12A or by inserting the preamble at the start of a data field as shown in FIG. 12B.

(Modifications)

The present disclosure is not limited to the above embodiments. For example, the present disclosure can be modified or expanded as follows.

The preamble can have any data pattern. The number of bits in the end part can be "3" or more.

The same-edge interval and the same-value interval can be measured in units of time by using a timer. Further, the reference bit length information can be treated in units of time.

The present disclosure can be applied to other communication protocols besides asynchronous communication and CAN FD.

What is claimed is:

1. A receiving apparatus comprising:
an edge interval measuring block that measures a first same-edge interval from when a first start edge indicative of a start of a known bit stream of consecutive bits of a same value in a received bit stream is detected to when a next edge changing in a same direction as the first start edge is detected; and
a bit number detector that detects a number of bits in the first same-edge interval based on reference bit length information and detects a first number of bits in a same-value interval between consecutive bits of a same value by subtracting a number of bits in the known bit stream from the number of bits in the first same-edge interval, wherein
the edge interval measuring block measures a second same-edge interval from when a second start edge indicative of a start of the same-value interval is detected to when a next edge changing in a same direction as the second start edge is detected, and
the bit number detector detects a number of bits in the second same-edge interval based on the reference bit length information and detects a second number of bits in a bit stream of consecutive bits of a same value opposite to the value in the same-value interval by subtracting the first number of bits from the number of bits in the second same-edge interval.

2. The receiving apparatus according to claim 1, wherein the edge interval measuring block measures the first and second same-edge intervals based on the reference bit length information obtained from a data pattern of a period of a preamble placed at a start of the received bit stream.

3. The receiving apparatus according to claim 2, wherein the edge interval measuring block measures a length of the period of the preamble and obtains the reference bit length information based on the length of the period.

4. The receiving apparatus according to claim 2, wherein the edge interval measuring block measures an interval between edges changing in a same direction during the period of the preamble and obtains the reference bit length information based on a number of bits in the measured interval.

5. The receiving apparatus according to claim 4, wherein the edge interval measuring block sets the end part to be a bit stream of more than two bits including a start bit and a subsequent bit having a value different from that of the start bit.

6. The receiving apparatus according to claim 1, wherein the edge interval measuring block measures the first and second same-edge intervals by oversampling.

7. The receiving apparatus according to claim 1, wherein the edge interval measuring block determines a sampling timing based on the reference bit length information, and the edge interval measuring block performs data sampling during the first and second same-edge intervals and measures the first and second same-edge intervals based on a number of times the data sampling is performed.

8. The receiving apparatus according to claim 1, wherein the edge interval measuring block successively measures first and second same-edge intervals in a bit stream subsequently received, and
the bit number detector detects a number of bits in the first and second same-value intervals.

9. The receiving apparatus according to claim 1, wherein the received bit stream is recovered in asynchronous communication.

10. The receiving apparatus according to claim 1, wherein the known bit stream has a last bit placed in an end part of a preamble placed at a start of the received bit stream.

11. The receiving apparatus according to claim 1, wherein the received bit stream is a signal generated by an open-drain output.

12. The receiving apparatus according to claim 1, wherein the received bit stream is a signal generated by a photocoupler output.

13. A method, performed by receiving device, for detecting a number of consecutive bits of a same value, the method comprising:
a first step of measuring a first same-edge interval from when a first start edge indicative of a start of a known bit stream of consecutive bits of a same value in a received bit stream is detected to when a next edge changing in a same direction as the first start edge is detected;
a second step of detecting a number of bits in the first same-edge interval based on reference bit length information and detecting a first number of bits in a same-value interval between consecutive bits of a same value by subtracting a number of bits in the known bit stream from the number of bits in the first same-edge interval;
a third step of measuring a second same-edge interval from when a second start edge indicative of a start of the same-value interval is detected to when a next edge changing in a same direction as the second start edge is detected, and
a fourth step of detecting a number of bits in the second same-edge interval based on the reference bit length information and detecting a second number of bits in a bit stream of consecutive bits of a same value opposite to the value in the same-value interval by subtracting the first number of bits from the number of bits in the second same-edge interval.

14. The method according to claim 13, wherein the first step measures the first and second same-edge intervals based on the reference bit length information obtained from a data pattern of a period of a preamble placed at a start of the received bit stream.

15. The method according to claim 14, wherein a length of the period of the preamble is measured, and the reference bit length information is obtained based on the length of the period.

16. The method according to claim 14, wherein an interval between edges changing in a same direction during the period of the preamble is measured, and the reference bit length information is obtained based on a number of bits in the measured interval.

17. The method according to claim 16, wherein the end part is set to be a bit stream of more than two bits including a start bit and a subsequent bit having a value different from that of the start bit.

18. The method according to claim 13, wherein the first and second same-edge intervals are measured by oversampling.

19. The method according to claim 13, wherein when the first step determines a sampling timing based on the reference bit length information, data sampling is performed during the first and second same-edge intervals, and
the first and second same-edge intervals are measured based on a number of times the data sampling is performed.

20. The method according to claim 13, wherein
the first to fourth steps are repeatedly performed so that the first and second numbers of bits are successively detected in a bit stream subsequently received.

21. The method according to claim 13, wherein
the received bit stream is recovered in asynchronous communication.

22. The method according to claim 13, wherein
the known bit stream has a last bit placed in an end part of a preamble placed at a start of the received bit stream.

* * * * *